UNITED STATES PATENT OFFICE.

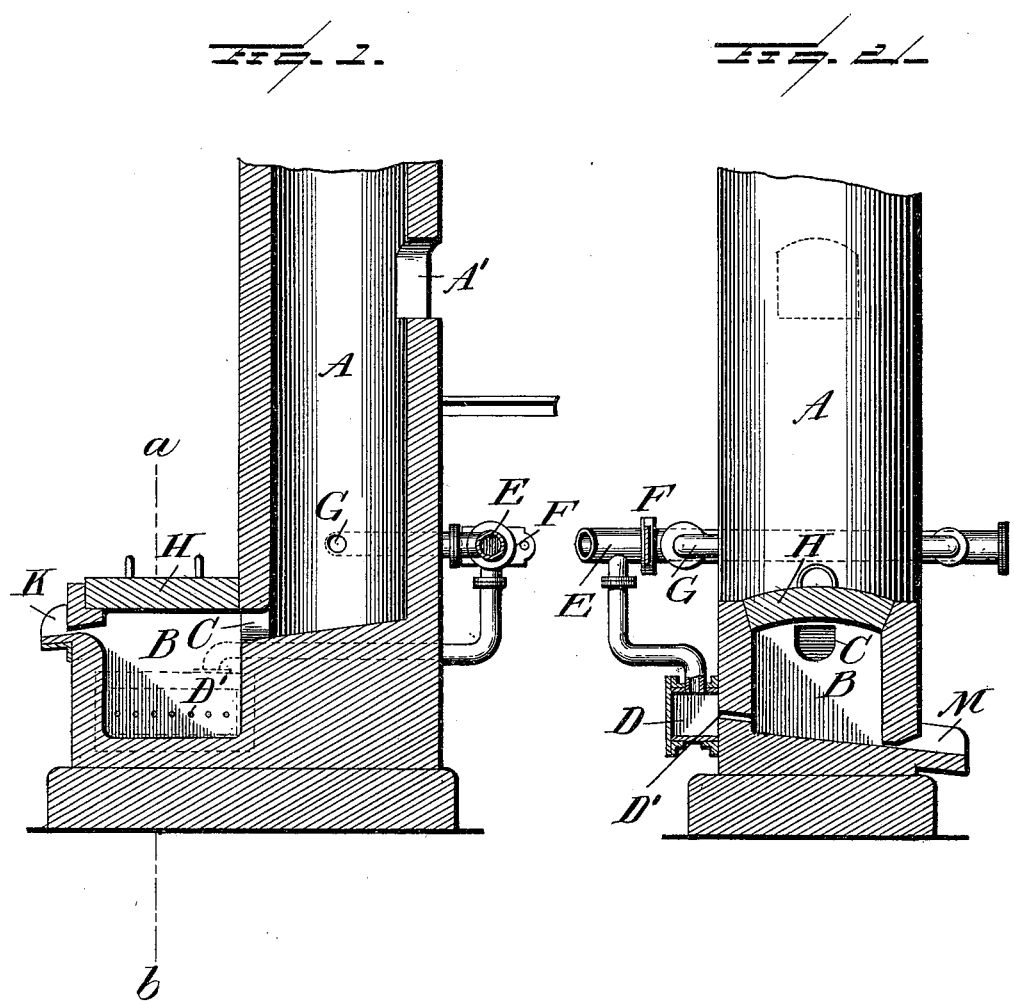

THOMAS JAMES HESKETT AND HENRY JONES, OF ADELAIDE, SOUTH AUSTRALIA, ASSIGNORS TO SAID THOMAS JAMES HESKETT.

APPARATUS FOR THE MANUFACTURE OF STEEL.

SPECIFICATION forming part of Letters Patent No. 675,215, dated May 28, 1901.

Application filed April 16, 1901. Serial No. 56,130. (No model.)

*To all whom it may concern:*

Be it known that we, THOMAS JAMES HESKETT and HENRY JONES, subjects of the British Queen, residing at Adelaide, South Australia, have invented certain new and useful Improvements in Apparatus for the Manufacture of Steel; and we do hereby declare the following to be a full, clear, and exact description of the invention, such as will enable others skilled in the art to which it appertains to make and use the same.

This invention is for the purpose of more conveniently and with greater economy manufacturing steel of any desired temper from iron or from suitable ores or metals.

By our invention pig-iron, steel scrap, wrought-iron scrap, or any suitable mixture of these metals may be manufactured into steel of desired temper for steel castings or produced in ingots to be afterward rolled or forged.

In the Bessemer process, which is very largely employed in steel manufacture, a given quantity or charge of pig-iron is melted and conveyed to an open converter, which is separate and apart from the melting furnace or cupola, and the charge is converted into steel by the forcing of air-currents through the metal until the contained carbon has been reduced to the required percentage. During the operation the combustible gases formed pass off at a very high temperature and burn at the mouth of the converter, doing no useful work. At the same time a considerable percentage of the metal in a finely-divided state is ejected from the converter along with the gases, owing to the very violent ebullition which takes place. In our invention the converter is connected by a short covered fireproof channel with the cupola and is covered during the operation, by which means we obtain the following advantages, namely: The heat of combustion and the combustible gases given off in the conversion of the molten iron to steel instead of being wasted, as in open converters, are continuously utilized in the melting down of the contents of the cupola, the operations of melting down and converting both being continuously and simultaneously carried on, and so that a bath of steel is maintained in the converter and is constantly being supplied with additional heat in the form of highly-carburized metal going down from the smelting zone of the cupola, and the heat of the steel in the converter is kept at a uniform temperature high enough for the oxygen from the blast to combine with the carbon in the metal at once on its falling into the converter. The foregoing results are rendered possible by providing a short covered fire-brick-lined channel or flue connecting the cupola and converter, which lining is kept very hot by the waste heat from the converter-gases escaping from the converter into the cupola without loss of heat by exposure to the atmosphere or contact with material at a lower temperature than itself.

Another advantage of our invention is that variable quantities and variable qualities of steel can be tapped out of the converter without suspending the operation and chemical action.

Another advantage of the invention is that the particles of metal which are necessarily ejected and lost in an open converter are by our method saved and returned to be utilized.

In order that our invention may be clearly understood, we will now describe the same with reference to the accompanying drawings, wherein the same parts are indicated by the same letters throughout both views.

Figure 1 is a central vertical section of the apparatus, and Fig. 2 is a vertical section on line *a b* of Fig. 1.

As before stated, our invention is based upon the principle of having the converter connected and combined with the cupola by a short covered fireproof channel.

In the drawings, A is a cupola with feed-opening A', in which the ore or metal is melted.

B is the converter, and C a flue lined with fire-brick resisting material, connecting the cupola with the converter.

D is a blast-box with a number of small twyer-holes D', arranged to deliver the blast into the converter below the surface of the molten metal.

E is a blast-pipe connected with a "Root" or other blower or a blowing-engine.

F is a valve which regulates the quantity of blast which it is desired to pass through the cupola-twyers G.

H is a brick-lined removable cover, so that the converter-lining can be repaired and renewed.

K is a slag-hole through which an iron rod is inserted to take a sample of the molten steel, also for the overflow of slag, and at the same time permitting a limited escape of flames, by which the state of the operations may be judged.

In operation the cupola is charged with scrap steel, raw iron, and pig-iron. The quantity of each is determined by analyzing the various components of the charge and proportioning the weights thereof so that the mixture contains as nearly as possible the same chemical constituents as those which characterize the metal in the Bessemer process after the second stage has been reached. Suitable quantities (as determined by analysis) of fuel and flux are also used. In some cases no flux is required, and as a matter of course ore may be used instead of the whole or part of the iron. The charge is then melted in the usual way and the temperature is raised to not less than 2,000° centigrade, the blast being delivered into it through the twyers G. The molten metal runs down through the passage C into the converter B, where a blast is applied through the twyers D' of sufficient quantity and strength until the contents have been reduced by the expulsion of the carbon to the required composition. The rate of conversion of the molten iron into steel is constant because the blast-pressure is constant, the pipe D being in open communication with the blower. The rate of melting down is capable of variation in the cupola, being regulated at will by a valve or valves, such as F, which intercept and control the blast passing into the cupola-twyers. By this means the reduction of metal can be hastened or retarded and steel with greater or less percentage of carbon produced accordingly in the converter.

M is the tap-hole for drawing off molten steel to suitable ladles or molds.

In order to produce continuously any particular quality of steel, all that is required is to balance the rate of melting in the cupola with the rate of reduction in the converter by setting the cupola-blast-regulating valve to a certain point, which is quickly ascertained by practice. The furnace will then go on for hours, producing the same quality of steel. The samples of steel which are taken frequently from the bath of steel by means of iron rods passed through the slag-hole in the converter, together with the color of the slag and the appearance of the small jet of flame at the slag-hole, give a ready indication of any irregularity in the cupola, which can at once be checked by increasing or decreasing the volume of blast supplied to the cupola.

Any change in the quality of the metal in the converter must take place slowly, as a bath of steel sufficient to cover the twyer-hole is maintained constantly, and the small stream of crude iron flowing into it from the cupola and gradually hardening the steel, as well as filling the converter, is counteracted in its hardening tendency by the action of the converter-blast below.

Any required quantity of steel can be tapped off from time to time as in an ordinary iron cupola, provided the converter is not completely emptied of its metal, which it is not advisable to do if a uniform quality of steel is desired. The converter-blast gage gives a ready indication of the quantity of metal in the converter at any time, as does also the quantity of slag, which is more freely ejected as the metal rises in the converter.

Our invention, as above described, while suitable for steel manufacture from ore or metal on a large scale is particularly adapted for foundry purposes, as a given quantity of molten steel can be tapped out of the converter without interfering with the working of the converter. Consequently the operations of melting down and converting go on simultaneously and continuously. The steel after ascertaining by sample that it is of the desired quality is taken off in any desired quantity from the converter to the molds at its highest temperature, thus avoiding loss through skulls in the ladles.

Fuel is economized in melting by making use of the heat of combustion and the combustible gases given off at the converter. As the gases are combustible and at a high temperature, they pass through the opening C and burn at the melting-down twyers G, giving off an intense heat. It will be seen that from the time the metal is charged into the cupola it is subjected to a constantly-increasing temperature until it is tapped into the ladle.

Metal is economized and saved by having the converter covered and closed in, except the small slag-hole, so that practically the particles of metal that in an open converter are thrown off and lost are by our process carried with the products of combustion through the opening C and then intercepted and returned to the converter along with the down-flowing metal.

Plant is economized in foundries because an ordinary iron-foundry plant can be adapted at slight expense for producing steel according to our invention. The cupola-furnace can also be used for ordinary iron-casting purposes by closing temporarily the converter twyer-holes with sand or by blocking up the brick-lined channel C and making a tapping-hole at the raking-out door at the bottom of the cupola.

It will be obvious that for large operations two or more converters may be advantageously connected with one cupola to enable repairs to be effected in the converters at the same time that the smelting operations are proceeding.

The invention may be applied to the manufacture of steel direct from the ore by charging the ore, fuel, and fluxes into the cupola-furnace in the usual way.

We have ascertained by trials that with our invention we can obtain more heat than is required in producing steel with one per cent. of silicon, whereas under other processes two per cent. to three per cent. is required, and at the same time our process enables us to use a much greater proportion of scrap than can be used in the Bessemer process.

Having thus described our invention, what we claim as new, and desire to secure by Letters Patent, is—

1. The apparatus for utilizing the combustible gases together with the waste heat issuing from a Bessemer converter, consisting of a converter lined with fire-resisting material, a blast-box, a number of small twyer-holes arranged to deliver the blast into the converter below the surface of the molten metal, a removable cover lined with fire-resisting material, a slag-hole in the upper part of the said converter through which samples may be taken, and a short confined fireproof channel lined with fire-resisting material leading from the upper part of the converter to the bottom of the cupola so situated and proportioned that while the molten metal runs continuously down through it to the converter, the combustible gases, the particles of metal blown off, and the waste heat from the converter are all conveyed thereby continuously into the cupola below the twyers and the combustible gases burned at the mouth of the twyers, as and for the purposes described.

2. The apparatus for making steel, which consists of a cupola adapted to be heated by carbonaceous fuel, twyers located near the base of the said furnace, a main valve to regulate the flow of air from said twyers into said cupola, a closed Bessemer converter provided with twyers, and a short inclosed inclined channel leading from the lower part of the cupola-furnace to the top of the converter so situated and proportioned that while the molten metal runs directly down through it to the converter, the combustible gases, the particles of metal blown off, and the waste heat from the converter are all conveyed directly into the cupola below the twyers and the combustible gases burned at the mouth of the twyers, substantially as described.

In testimony whereof we affix our signatures in presence of two witnesses.

THOMAS JAMES HESKETT.
HENRY JONES.

Witnesses:
CHARLES NICHOLAS COLLISON,
G. JERVIS CRESPIN.